United States Patent
Stamm et al.

(10) Patent No.: US 6,327,284 B1
(45) Date of Patent: Dec. 4, 2001

(54) DETECTOR WITH FREQUENCY CONVERTING COATING

(75) Inventors: Uwe Stamm; Hans-Stephan Albrecht; Uwe Leinhos; Wolfgang Zschocke, all of Göttingen (DE)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 09/172,805

(22) Filed: Oct. 14, 1998

(51) Int. Cl.$^7$ .................................................. H01S 3/13
(52) U.S. Cl. .................................. 372/32; 372/5; 250/372
(58) Field of Search ........................... 372/32, 5; 250/372

(56) References Cited

U.S. PATENT DOCUMENTS 5,514,871 * 5/1996 Hayes et al. ......................... 250/372

OTHER PUBLICATIONS

Mann et al, Characterization and Shaping of Excimer Laser Radiation, Laser–Laboratorium Gottingen e.V., pp. 347–358.*
Albrecht et al, Measurement and evaluation methods for beam characterization of commercial excimer lasers, Laser Beam and Optic Characterization, Jul. 1996.*
"Two–dimensional Temperature Mapping Using Thermographic Phosphors", B.W. Noel, W.D. Turley, M.R. Cates and K.W. Tobin, Electrochemical Soc. Meeting, Montreal 1990, vol. 90–1, Pg1296.
"Römpp Chemie Lexikon" 9th Edition, 1989.
"Aging of Phosphors in Projection TV Tubes" T. Welker, S. Klauer, J.H.M. Sprull, and L. Vriens, Electrochemical Soc. Meeting, Hawaii 1987, vol. 87–2, Pg 1730–1731.
"Factors Inducing Degradation of InBO$_3$:Tb by Electron Radiation", H. Yamamoto, H. Matsukiyo, Y. Morita, and Y. Uchara.
"The Deposition of Transparent Luminescent Screens of Y$_2$O$_3$:Eu :A Comparison of Thermal Evaporation and R–F Sputtering", B.J. Green, G.H. Camp, I.G. Gibb, and R. Bellerby.
"Measurement and Evaluation Methods for Beam Characterization of Commercial Excimer Lasers", H.S. Albrecht, U. Rebhan, K. Mann, and J. Ohlenbusch, Proc. of 3rd International Workshop on Laser Beam and Optic Characterization, Quebec, Jul. 1996.
"Characterization and Shaping of Excimer Laser Radiation", K. Mann and A. Hopfmüller, Laser–Laboratorium, Göttingen, Germany.
Loose sheet from Electrochemical Soc. Meeting, vol. 87–2, Figs. 1 and 2.
Loose sheets from Journal of Electrochemical Soc.: Solid–State Science and Technology, Feb. 1976, Pgs 246, 248.

\* cited by examiner

Primary Examiner—Frank G. Font
Assistant Examiner—Armando Rodriguez
(74) Attorney, Agent, or Firm—Sierra Patent Group, Ltd.; Andrew V. Smith

(57) ABSTRACT

An ultraviolet light detection system is provided wherein a dark current background growth rate with total accumulated exposure dose is avoided, and parameters of an ultraviolet radiation source such as an ArF-excimer laser may be monitored without rapid degradation of the signal by the superposition of the dark current background over a desired signal. The invention provides a detector including a light sensitive element having a frequency conversion coating on its surface. The coating is preferably directly on the light sensitive element, absorbing incident ultraviolet light and re-emitting visible light in a direction toward the light sensitive element. The coating minimizes a dark current background that would otherwise appear when incident ultraviolet light impinges directly upon the light sensitive element, and thereby extends a lifetime of the light sensitive element. The detector is useful for detecting a wide range of ultraviolet wavelengths, and is particularly useful in solving the dark current growth rate with total accumulated exposure dose problem associated with detecting incident radiation under 240 nm.

28 Claims, 4 Drawing Sheets

DETECTOR WITH FREQUENCY CONVERTING COATING

BACKGROUND OF THE INVENTION

1. Field of the Invention

The present invention relates to a light detector for ultraviolet radiation, and more particularly to a light detector having a frequency converting coating for converting the ultraviolet radiation to visible light before the light impinges upon a light sensitive element of the detector.

2. Discussion of the Related Art

The highest achievable resolution of a structure on silicon using light as a photolithographic tool is generally on the order of the emission wavelength of the (excimer laser) light source. The formation of structures on silicon substrates in the range of 100 nm thus uses photomicrolithography techniques employing deep ultraviolet (DUV, or 350–190 nm) or vacuum ultraviolet (VUV, or 190–100 nm) light sources as exposure tools.

Special techniques have been developed that enable the formation of structures as small as about half of the emission wavelength of the photolithographic light source used. Such techniques utilize narrowed excimer laser output beams. For example, when refractive optics are employed, the output beam can be narrowed to have an emission bandwidth of less than 0.6 pm. The wavelength stability is typically less than ±0.15 pm. When reflective or catadioptric optics are employed, the output beam is narrowed to have an emission bandwidth in a range from 15 pm to 100 pm. The wavelength stability of the output beam in this case is less than ±5 pm.

Perhaps the most efficient light source for producing 100 nm structures is the Argon-Fluoride (ArF)-excimer laser which emits light in a band centered around 193.3 nm and has a natural emission bandwidth around 500 pm. To form structures on silicon substrates having widths less than 100 nm, even smaller wavelength radiation sources are needed. The $F_2$-excimer laser emitting around 157 nm is a possible light source to be used for this purpose. Recent advances have already enabled the formation of 80 nm structures.

The high wavelength stabilities described above that help to enable photolithographic formation of structures half the size of the radiation wavelength are possible because several parameters associated with the laser output beam are monitored. Some of these parameters include the emission wavelength, bandwidth, pulse energy, and beam profile. The wavelength monitoring may be performed using a spectrometer such as one including a wavelength selection unit and a detector.

A problem exists with conventional detectors when they are exposed to short wavelength radiation, e.g., having a wavelength around 193 nm, 157 nm, or 209–219 nm, such as that emitted from an ArF-excimer laser, an $F_2$-laser, or a frequency-quintupled Nd-laser (Nd-YAG, Nd-YLF, Nd-YAP, Nd-YLJ e.g.), respectively. When energy densities in the range of nanojoules/cm² are directly incident on a conventional detector at these short wavelengths, a dark current background is generated which rapidly increases in proportion to a total accumulated exposure dose.

The dark current signal is background noise that superimposes itself over desired detection signals, and acts as an undesirable background artifact of spectra generated from data measured by the detector. Dark currents are also generated when detectors are exposed to longer wavelengths. However, the dark current background generated when the same detectors are exposed to KrF-excimer laser source radiation around 248 nm, increases with total accumulated exposure dose at least an order of magnitude slower than when exposed to 193 nm radiation. It is believed that the rapid increase in the dark current background with total accumulated exposure dose observed at shorter wavelengths is caused by changes induced by high energy photons in semiconductor chips used to fabricate the detectors.

The end result is that a conventional detector exposed to, e.g., an ArF-excimer laser, a $F_2$-laser, radiation will generate a greater and greater dark current background signal with exposure time, until the detector becomes useless. That is, after a period of time, or the "lifetime" of the conventional detector, the dark current background becomes so intense that it becomes undesirable to monitor any of the laser parameters mentioned above using the detector because the signal-to-noise ratio is below an acceptable limit. As an example, a conventional detector having a signal to noise ratio of forty-to-one prior to any exposure, may be observed to have a signal-to-noise ratio reduced to two- or three-to-one after $10^8$ pulses of high energy radiation.

When the signal-to-noise ratio drops to these low levels, it becomes too difficult to resolve spectral features out of the dark current background, and attempts to characterize laser parameters become unreliable. At that point, a new detector is configured, aligned and calibrated to replace the old "worn out" detector. This procedure results in undesirable down time for the system, as well as replacement cost.

As discussed below in the summary, the present invention provides a detector having a frequency conversion coating on its surface, and a laser system including the detector. The coating converts incident ultraviolet light into longer wavelength light. The longer wavelength light impinges upon the detector element without producing the type of dark current background which grows quickly in proportion to total accumulated exposure dose. The lifetime of a detector element having the frequency conversion coating on its surface is thus lengthened dramatically, thus decreasing system downtime and cost.

Quantum frequency converters have been used in the past for changing the energy of incident carriers to another, typically lower, energy. For example, electron bombardment of optical surfaces coated with phosphors, results in the emission of light from the phosphor coating. Prime examples include phosphor television and computer screens incorporating cathode ray tubes.

Quantum converters have also been installed within detection systems employing CCD cameras. See H. S. Albrecht, U. Rebhan, K. Mann and J. Ohlenbusch, Measurement and Evaluation Methods for Beam Characterization of Commercial Excimer Lasers, Proc. of 3rd Int. Workshop on Laser Beam and Optics Characterization (LBOC), Quebec, Canada (July 1996), SPIE Vol. 2870, 367 (1996); K. Mann and A. Hopfmüller, Characterization and Shaping of Excimer Laser Radiation, Proc. of 2nd Workshop on Laser Beam Characterization, S. 347, Berlin, Mai (1994). These quantum converters are incorporated as coated or doped plates for converting ultraviolet light to visible light, the purpose being so that standard visible light refractive imaging systems could be used. The quantum converter used was a Ce or Tb doped glass plate inserted in front of the detector.

The converter plate is displaced from the detector surface and serves as a window to the detector. After conversion to visible light by the plate, the light is imaged by an imaging lens before entering the detector and being detected by a CCD camera. The distance needed for imaging the light after quantum conversion increases the overall packet size of the detector unit. Moreover, procedures for properly aligning the imaging optics are necessary and require extra time and effort.

Until now, only 248 nm radiation from a KrF-laser has been substantially used in photolithography. The 248 nm light has not been observed to produce any substantially increasing dark current background. Now that the use of 193 nm light has brought with it the dark current growth problem, another detection system and technique to alleviate the problem has become necessary.

SUMMARY OF THE INVENTION

It is therefore desired to have a detector wherein the dark current growth with total accumulated exposure dose problem described above is avoided, and parameters of an ultraviolet radiation source such as an ArF-excimer laser, a $F_2$-laser, and/or a frequency-quintupled Nd-laser, e.g., may be monitored without rapid degradation of the signal by superposition of the growing dark current background over a desired signal. The present invention satisfies this desire by providing a detector including a light sensitive element having a frequency conversion coating on its surface. The coating is preferably directly on the surface of the light sensitive element, absorbing incident ultraviolet light and re-emitting visible light which is detected by the light sensitive element.

Advantageously, the coating greatly reduces the growth rate of the dark current background with total accumulated exposure of the light sensitive element to DUV or VUV ultraviolet radiation. Thus, a detector according to the present invention has its lifetime greatly extended. A detector in accord with the present invention is useful for detecting a wide range of ultraviolet wavelengths, and is particularly useful in solving the dark current problem associated with detecting incident radiation under 240 nm.

A laser system is also provided comprising a gain medium, a resonator including an output coupler, and at least one detector. The detector includes a light sensitive element having a coating thereon for converting incident ultraviolet light to longer wavelength light preferably having a wavelength longer than 240 nm before the light impinges upon the light sensitive element.

DETAILED DESCRIPTION OF THE PREFERRED EMBODIMENT

Figure 1A:
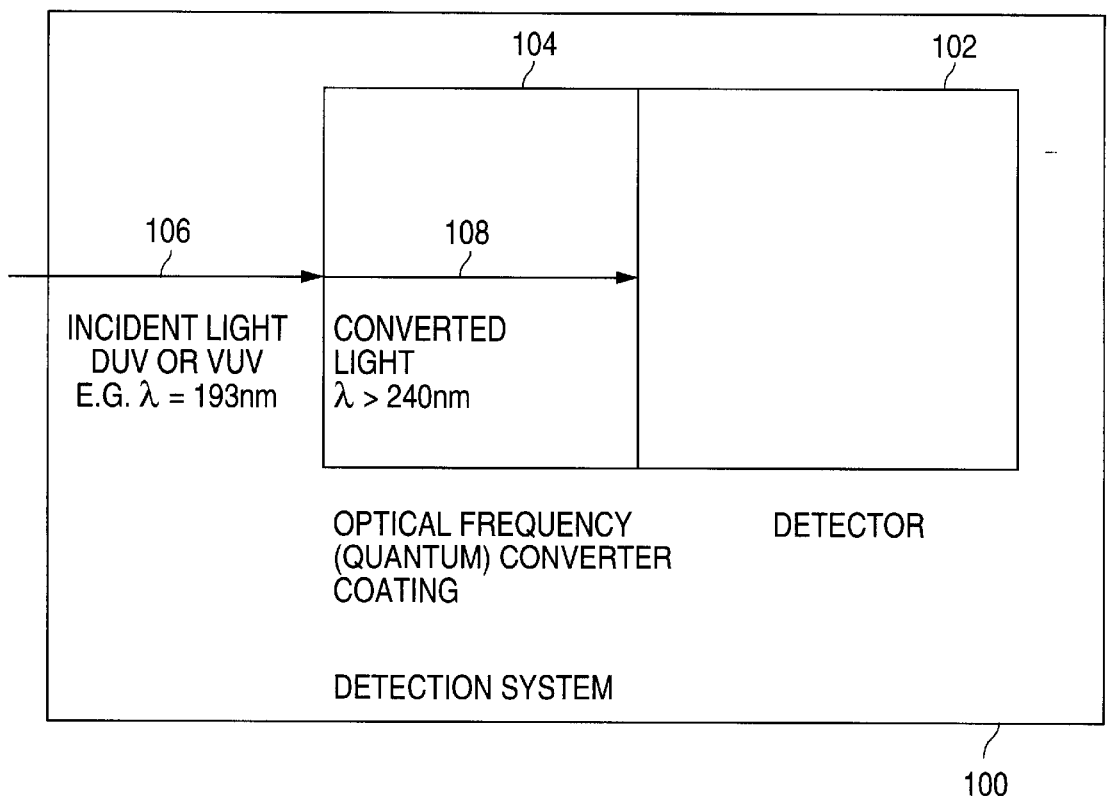
FIG. 1A illustrates a detector with a frequency conversion coating in accord with the present invention.

FIG. 1A illustrates a detection system 100 including a detector 102 and a frequency conversion coating 104 in accord with a preferred embodiment of the present invention. For some specific applications, the detector 102 is position sensitive. Such a detector 102 is preferably an array detector, e.g., a CCD camera, a position sensitive detector (PSD), or a diode array. The detector 102 may be a total energy detector or intensity detector when such detection is desired, e.g., a photodiode or photomultiplier tube. The detector 102 may be particularly configured for detection of light comprising a specific band of wavelengths, and the detector 102 may be a broadband detector. In that regard, the detector 102 may be a photodiode array, a CCD camera, a photodiode, a position sensitive detector (PSD), a photomultiplier tube, or another type of detector depending on the particular purpose to which the detector 102 is being applied. Such purposes include the measurement of beam energy, beam profile, beam diameter, beam width, beam position, wavelength, linewidth, beam lateral and/or angular stability, etc.

As shown in FIG. 1A, ultraviolet light 106 is incident on the detection system 100. It is anticipated that for photolithographic applications, e.g., the incident ultraviolet light 106 may comprise a band of wavelengths in the deep ultraviolet (DUV) or vacuum ultraviolet (VUV) region of the electromagnetic spectrum. As discussed above, a preferred DUV light source is an ArF-excimer laser emitting around 193 nm and a preferred VUV light source is a $F_2$-laser emitting around 157 nm. A system including light incident from a frequency-quintupled Nd-laser (e.g., Nd-YAG, Nd-YLF, Nd-YAP, Nd-YLJ) outputting a beam around 209–219 nm may also be enhanced by incorporating the present invention.

The incident light 106 first impinges upon the frequency converting coating 104 of the detection system 100. The coating converts DUV and/or VUV light to light having a wavelength longer than 240 nm. The coating 104 preferably comprises $Y_2SiO_5$:Tb, LaOBr:Tb, or $InBO_3$:Tb, where traces of Tb are used as dopants in host matrices. Alternatively, $La_2O_2S$:Eu, $Y_2O_3$:Eu, ZnS:Ag, LaOCl:Tm, $Y_3Al_5O_{12}$:Tb, $Y_3(Al,Ga)_5O_{12}$, LaOBr:Tb, or any of these hosts doped with any of Tb, Tm, or Ce, may be used. The specific frequency conversion materials listed above are exemplary and a coating comprising another material that converts light under 240 nm, or DUV and/or VUV light, to light having a wavelength longer than 240 nm may used with a detector in accord with the present invention.

The coating is preferably deposited directly on a surface of the light detection element 102. The coating is located, and is preferably deposited, directly on the detection element 102, rather than on a surface located some distance away from the detection element. Advantageously, the present invention allows an image to remain intact after undergoing the conversion process. As mentioned above, in the prior art, a frequency conversion plate has been inserted in front of a detector, some distance from the detector. Passage through the plate, however, results in imaging errors and deterioration. That is, when a frequency conversion plate is located sufficiently far from a detector element, image data is distorted at the detector element without employing an imaging lens. An imaging lens may be inserted between the plate and the detector, but this takes up valuable space and involves time and effort to align the system.

The coating 104 functions to absorb photons of the incident ultraviolet light 106 and re-emits photons of longer wavelength light 108. The longer wavelength photons 108 then travel in the same or similar direction as the incident, now absorbed, photons 106. The frequency converted photons 108 preferably have a wavelength longer than 240 nm, and may particularly be visible light. The converted photons 108 then impinge upon the light sensitive element 102 itself. Advantageously, only the converted photons 108 having wavelengths longer than 240 nm are incident upon the light sensitive element 102.

Figure 1B:
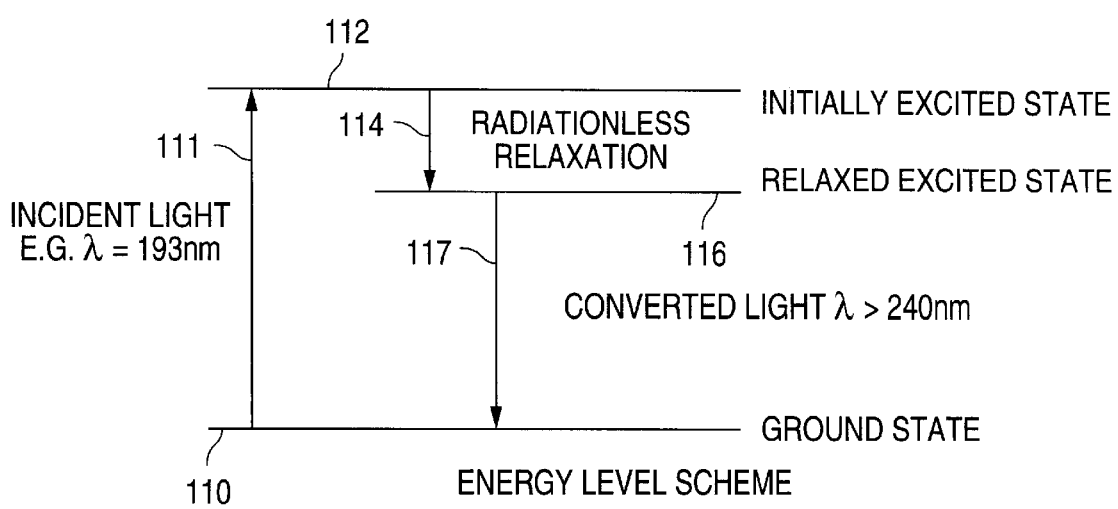
FIG. 1B is an energy level diagram illustrating the function of the frequency conversion coating of FIG. 1A.

FIG. 1B is an energy level diagram illustrating the function of the frequency conversion coating of FIG. 1A. The process of frequency conversion due to the frequency conversion coating 104 of FIG. 1A is illustrated in FIG. 1B to provide an understanding of the frequency conversion process. FIG. 1B is only intended to illustrate a basic frequency conversion process, and it is not asserted that this process is the precise physical process that takes place as incident photons 106 impinge upon the coating 104. The actual process will depend on the material used for the frequency conversion and the incident wavelength. For example, a four level system may more accurately represent the frequency conversion process, wherein an additional radiationless transition takes place.

At least according to FIG. 1B, incident photons 106 are absorbed by ground state (110) atomic and/or molecular constituents of the lattice, or the lattice itself, of the frequency conversion coating 104 of FIG. 1A. This absorption causes energy level transitions 111 from the ground state 110 into a higher energy, initially excited state 112. The energy difference between the levels 110 and 112 is substantially equal to the energy of individual photons of the incident light 106.

A nonradiative transition 114 then occurs including a relaxation of the lattice or the atomic or molecular constituents thereof from the initially excited state 112 to a relaxed excited state 116. The difference in energy between the states 112 and 116 is substantially equal to the energy carried off in the nonradiative process 114. The energy difference between the relaxed excited state energy level 116 and the ground state energy level 110 is then less than that between the initially excited state level 112 and the ground state level 110, by substantially the energy of the nonradiative transition 114.

The excited lattice or constituents thereof then undergo a radiative relaxation transition 117. The individual photons of light 108 that carry away the energy in this transition 117 have less energy and longer wavelengths than the individual incident photons 106. It is these photons 108 that impinge upon the detector 102 itself, and not the higher energy photons 106 incident upon the coating 104.

As mentioned above, the frequency conversion that occurs within the frequency conversion coating 104 is advantageous. It has been observed that when high energy photons such as, e.g., those having wavelengths around 193 nm, or the emission wavelength of the ArF-excimer laser, are directly incident upon a detector not having the coating 104 of the present invention on its surface, and thus without being converted to lower energy by the coating 104, a dark current background will grow with total accumulated exposure dose at a rapid rate. This growth rate is drastically reduced when a detector includes the frequency conversion coating 104 according to the present invention.

Thus, prolonged exposure to high energy photons, such as those emitted around 193 nm by an ArF-excimer laser, e.g., will cause a detector to become useless because no meaningful data could be resolved out of the dark current background. The lifetime of a detector subject to dark currents produced by exposure to high energy photons over time is defined as the total exposure time of the detector when its data may be usefully resolved out of the dark current background. The lifetime of an uncoated detector may be around a few hundred million laser pulses, which is undesirably low. The lifetime of a light sensitive element 102 having a coating 104 on its surface according to the present invention is at least a few billion laser pulses or more, which is a significant improvement.

The frequency conversion coating 104 of the present invention increases the lifetime of the detector element 102 by an order of magnitude or more. Since the dark current growth rate problem is not observed to appear when radiation from a KrF-excimer laser around 248 nm is used, and the frequency conversion coating 104 converts incident photons 106 to photons 108 each having a wavelength at least as long as 240 nm, the present invention substantially minimizes the dark current problem of prior art detectors, even when ArF-excimer laser, $F_2$-laser, or frequency-quintupled Nd-laser radiation is being used.

Figure 2:
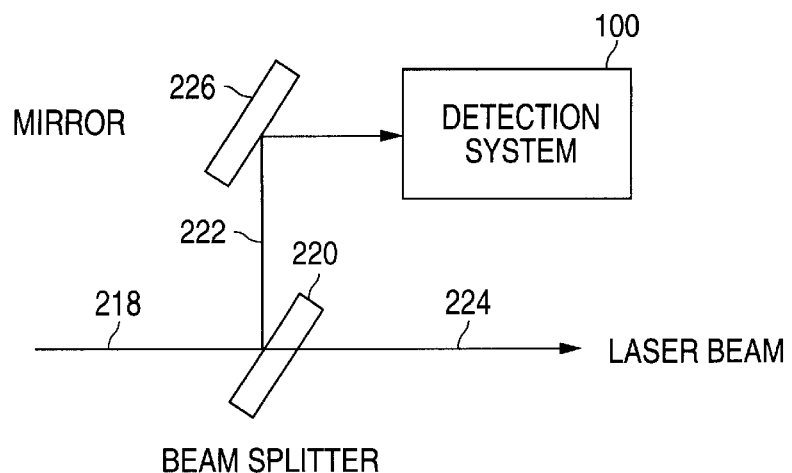
FIG. 2 schematically shows a preferred optical arrangement wherein a portion of a laser output beam is diverted to a detector in accord with the present invention, enabling one or more output beam parameters to be monitored.

FIG. 2 schematically shows a preferred optical arrangement of the present invention wherein a portion of a laser output beam is diverted to the detection system 100 of FIG. 1A, enabling one or more output beam parameters to be monitored. A laser output beam 218 impinges upon a beam splitter 220. The beam splitter 220 reflects a portion 222 of the output beam 218 and allows the remainder 224 of the output beam to continue, e.g., to perform photolithographic processing. The reflected portion 222 is then directed to the detection system 100. Although not generally necessary, a mirror 226 is shown redirecting the beam toward the detection system 100.

Figure 3A:
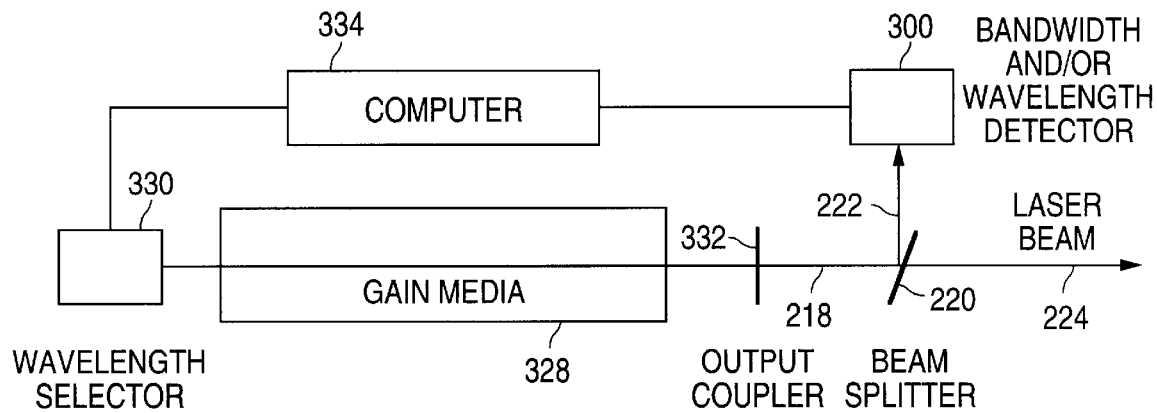
FIG. 3A schematically shows a preferred laser system arrangement including a detection system in accord with the present invention for monitoring wavelength and spectral bandwidth of a laser output beam.
Figure 3B:
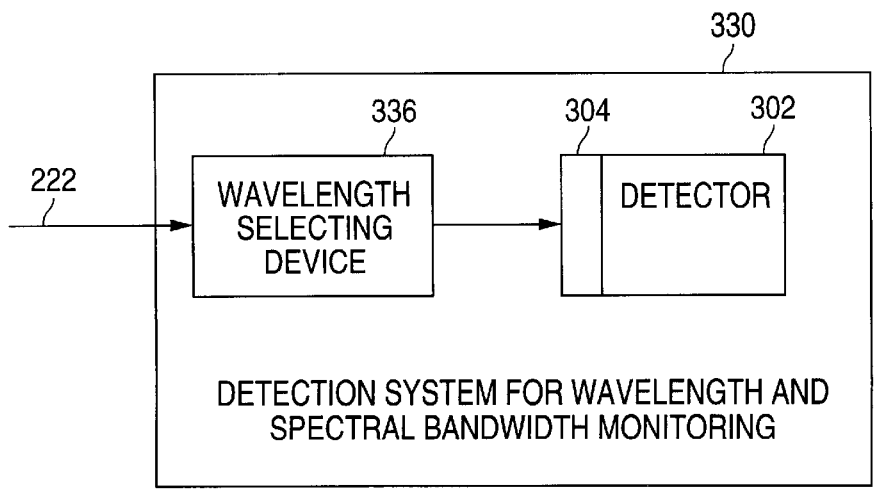
FIG. 3B illustrates the detection system of FIG. 3A.

FIGS. 3A and 3B schematically show a preferred laser system arrangement including a detection system in accord with the present invention for monitoring wavelength and spectral bandwidth of a laser output beam in a feedback loop. The arrangement includes a bandwidth and/or wavelength detection system 300 which, referring to FIG. 3B, includes a light sensitive element 302, which is preferably a photodiode array, a CCD-chip, a photodiode (energy detector) or a PSD. The light sensitive element 302 has a frequency conversion coating 304 on it.

The arrangement of FIG. 3A further includes a gain medium 328, a wavelength selection unit 330, and a resonator including an output coupler 332. In FIG. 3A, the resonator includes the output coupler 332 and at least one component of the wavelength selection unit 330 such as a grating, a prism, an etalon or a highly reflective mirror. A computer 334 processes information received from the detection system 300 and communicates with the wavelength selection unit 330 to adjust the wavelength and/or the bandwidth of the output beam 218. The arrangement thus includes a feedback loop. The wavelength selection unit 300 receives only a portion 222 of the output beam 218, allowing on-line detection to take place. The main fraction 224 of the output beam 218 continues unreflected by the beam splitter 220 toward its intended industrial application.

FIG. 3B illustrates the detection system of FIG. 3A. A wavelength selecting device 336 placed in front of the light sensitive element 302 having the frequency conversion coating 304 on its surface selects particular wavelengths to be detected. Thus, spectral analysis may be performed by the detection system 300 and the computer 334, which is desired for satisfactory wavelength and spectral bandwidth monitoring of a laser output beam 218.

Figure 4A:
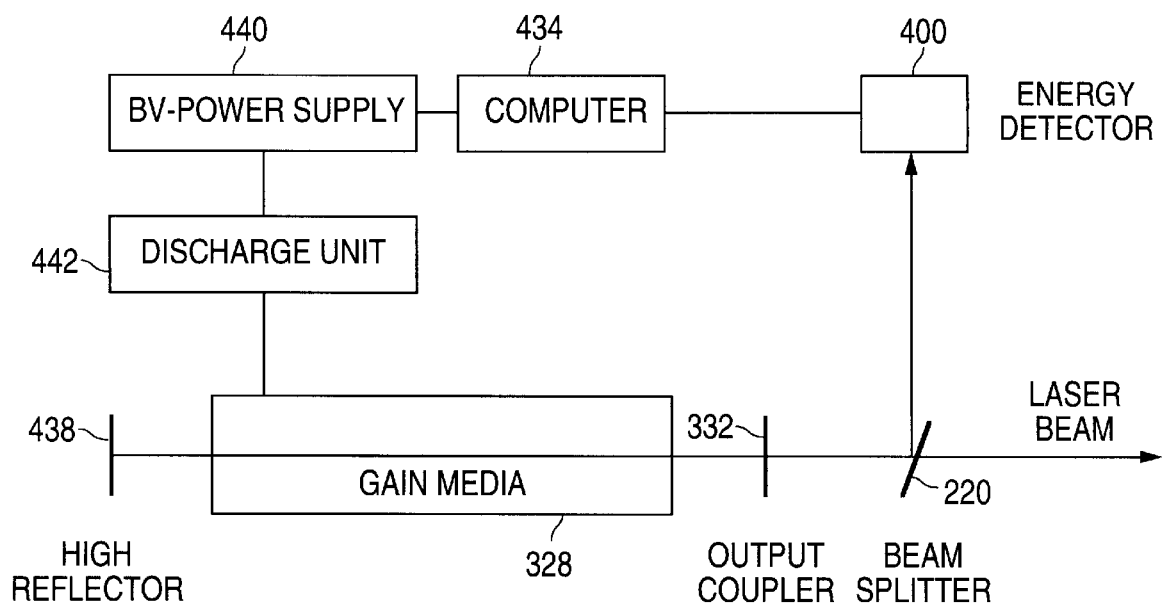
FIG. 4A schematically shows a preferred laser arrangement including a detection system in accord with the present invention for measuring pulse energy of a laser output beam.

FIG. 4A schematically shows a preferred laser arrangement including a detection system in accord with the present invention for measuring pulse energy of a laser output beam in a feedback loop. The arrangement of FIG. 4A is similar to that of FIG. 3A except that it is configured for pulse energy measuring and/or monitoring instead of for wavelength and/or bandwidth monitoring. To that end, a wavelength selection unit may or may not be incorporated within the resonator and thus the entire broadband spectral emission, or a narrowed spectral emission of the laser active gas may be output. The resonator of FIG. 4A includes a highly reflective mirror 438 instead of using the grating or the prism of the wavelength selection unit 330 as in the arrangement of FIG. 3A.

Figure 4B:
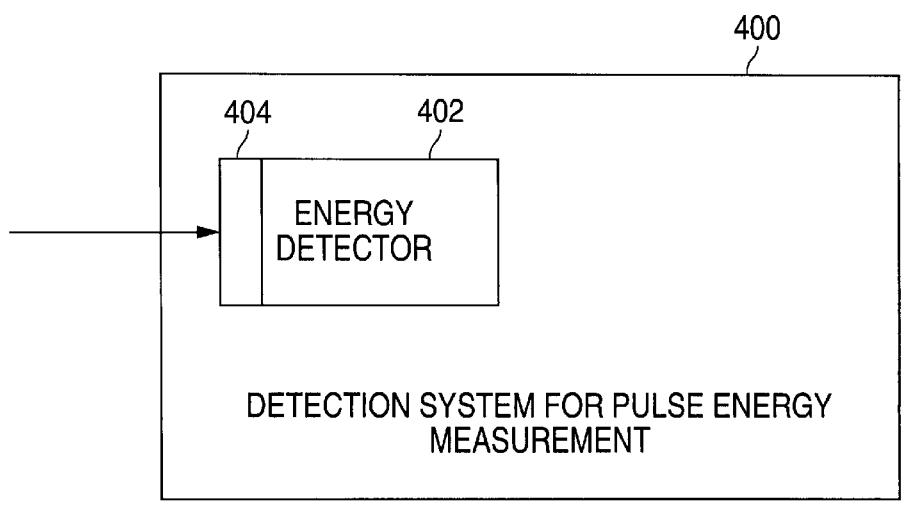
FIG. 4B illustrates the detection system of FIG. 4A.

Moreover, as shown in FIG. 4B, the detection system 400 includes a light sensitive element 402 which is configured to measure pulse energy and is thus an energy detector, and is preferably a photodiode or a pyroelectric detector, and is alternatively a photomultiplier tube. A computer receives the pulse energy information and controls, e.g., in the case of an excimer laser, a high voltage power supply 440 using the pulse energy information. Alternatively, one or more attenuators may be controlled rather than the high voltage. Also, for a YAG-laser, a driving current may be monitored and controlled. The arrangement may include a feedback loop, and may be operated manually. The high voltage power supply 440 shown in FIG. 4A supplies energy to the discharge unit 442 which, in turn, supplies energy to the gain medium 328 so that lasing action is possible. In this way, the pulse energy is monitored, controlled and stabilized. Once again, this is all performed while the system is on-line.

Referring to FIG. 4B, the detection system 400 includes a light sensitive element 402 having a frequency conversion coating 404, in accord with the present invention. The lifetime of the light sensitive element 402 having the coating on its surface is increased by at least an order of magnitude over a same one not having such the coating 404 on its surface. As a result, the system can remain online to perform industrial processing for a longer continuous time.

Figure 5A:
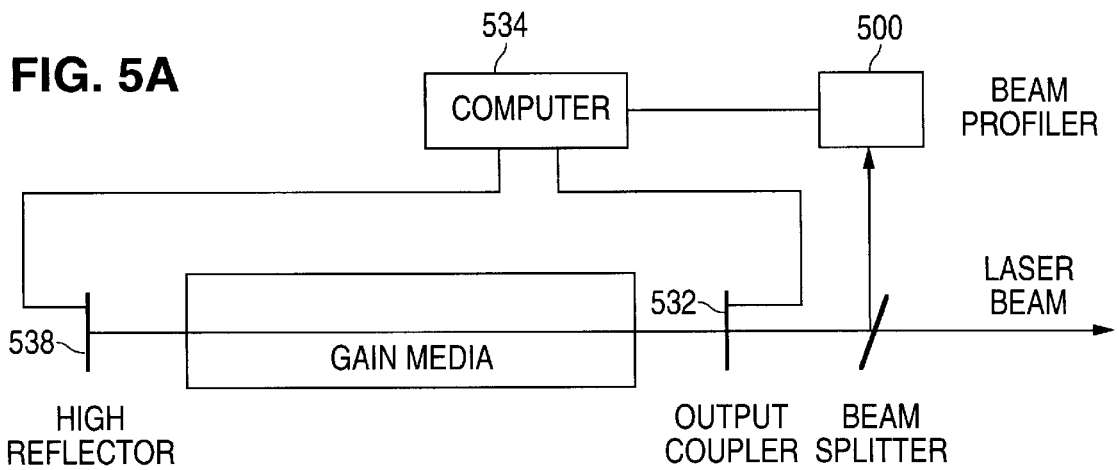
FIG. 5A schematically shows a preferred laser arrangement including a detection system in accord with the present invention for measuring laser output beam profiles.

FIG. 5A schematically shows a preferred laser arrangement including a detection system 500 in accord with the present invention for measuring laser output beam profile in a feedback loop. The detection system 500 of FIG. 5A, as specifically illustrated in FIG. 5B, includes a light sensitive element 502 configured to perform beam profiling, and is preferably a CCD camera, or alternatively, a PSD or a diode array. The light sensitive element 502 has a frequency conversion coating 504 on its surface. The arrangement of FIG. 5A preferably has a resonator including means for monitoring and adjusting a position of the output beam of the laser, specifically configured for beam profiling. The computer 534 controls the position monitoring and adjusting means. Although not necessary, the arrangement is configurable to be operated in a feedback loop.

Figure 5B:
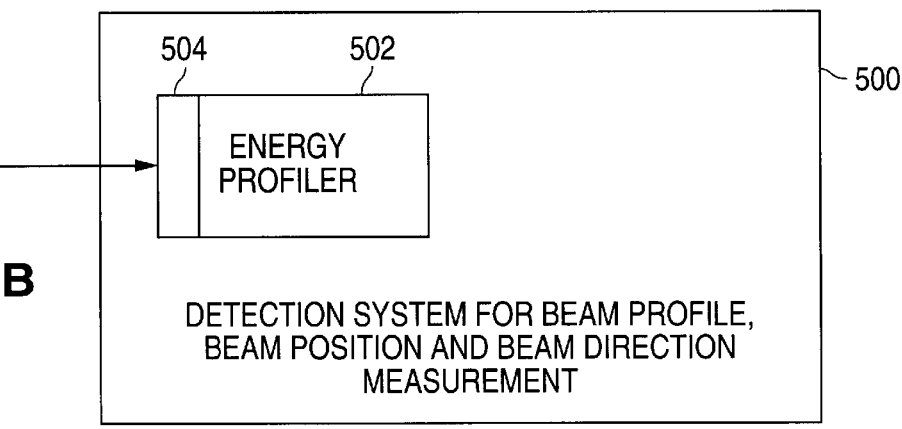
FIG. 5B illustrates the detection system of FIG. 5A.
Figure 5C:
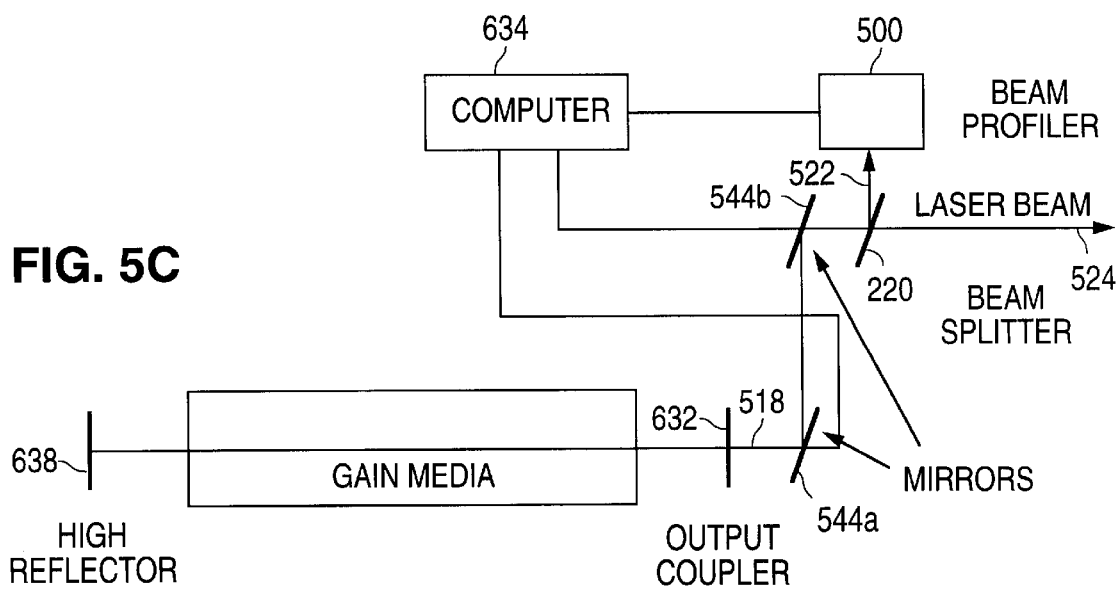
FIG. 5C schematically shows an preferred laser arrangement including a detection system in accord with the present invention for controlling laser output beam position and direction.

FIG. 5C schematically shows a preferred laser arrangement including a detection system 500 in accord with the present invention for measuring laser output beam position and direction in a feedback loop. The detection system 500 is the same as that of FIG. 5A, as shown in FIG. 5B. The arrangement of FIG. 5C preferably also includes means for monitoring and adjusting position and/or direction of the output beam of the laser. The output beam 518 is reflected by a pair of mirrors 544a and 544b before impinging upon the beam splitter 220 which splits the output beam into a portion 522, which is detected by the detection system 500, and a main fraction 524 which is applied to industrial use. The computer 634 preferably controls the output beam monitoring and adjusting means in a feedback loop.

Generally, among the light sensitive elements of detectors used in systems such as those shown in FIGS. 3A, 4A, 5A and 5C are a CCD-camera, a linear diode array and a position sensitive detector (PSD). The linear diode array operates to monitor a beam position in one direction. A PSD may be used to monitor a beam position in two-dimensions, and may be configured with a lens for monitoring a beam direction. A CCD camera may be used to monitor a beam position in two dimensions as well as a beam profile, and may also be configured with a lens for monitoring a beam direction.

Each of these light sensitive elements includes semiconducting material contained in a chip or chips. A CCD-camera typically operates in a pulse frequency range of 25–50 hz, while a PSD operates in a pulse frequency range up to a kilohertz or more. Thus, the PSD exhibits good time resolution. Systems configured with any of the CCD-camera, the PSD or the linear diode array may include a processor communicating with the detector and other elements of a laser system in a feedback loop of monitoring and adjusting various parameters of the laser system. Preferably, this monitoring and adjusting is performed while the system is "on-line" and an output beam is being used for industrial application. An extended lifetime of a detector according to the present invention thus advantageously increases continuous on-line industrial processing time.

What is claimed is:

1. An argon fluoride laser system, comprising:

a gain medium including a gas mixture of argon, fluorine and a buffer gas for generating a beam of ultraviolet radiation having a wavelength around 193 nm;

a discharge unit and a high voltage power supply for supplying energy to the gain medium;

a resonator including a wavelength selector for generating a narrowed output beam having a bandwidth of less than 0.6 pm;

a detector for measuring an energy of the output beam including a light sensitive element and a frequency conversion coating for absorbing incident 193 nm light and re-emitting light having a wavelength longer than 240 nm in a direction toward said light sensitive element, such that a dark current background, known to grow rapidly when light sensitive elements are used without protective frequency conversion coatings, is suppressed permitting the detector to have a lifetime of more than one billion laser pulses and permitting the laser system to remain on-line to perform continuous industrial processing during the more than one billion laser pulse lifetime of said light sensitive element; and a processor for receiving a signal from the detector indicative of the measured energy of the laser beam, and for sending a signal to the high voltage power supply based on the measured energy to control the high voltage power supply to supply a particular energy to the discharge circuit for stabilizing an energy of the output beam of the laser through a feedback loop including the detector, the processor and the high voltage power supply and discharge circuit.

2. The laser system of claim 1, wherein the wavelength selection unit includes a grating.

3. The laser system of claim 2, wherein the wavelength selection unit further includes a prism.

4. The laser system of claim 3, wherein the wavelength selection unit further includes an etalon.

5. The laser system of claim 1, wherein the light sensitive element is a photodiode.

6. The laser system of claim 5, wherein the frequency conversion coating comprises a fluorophor doped with a dopant selected from the group of dopants consisting of Tb, Tm, Eu, Ag and Cs.

7. The laser system of claim 6, wherein the frequency conversion coating comprises a compound selected from the group consisting of $Y_2SiO_5$, LaOBr, $InBO_3$, $La_2O_2S$:Eu, $Y_2O_3$, ZnS, LaOCl, $Y_3Al_5O_{12}$, $Y_3(Al,Ga)_5O_{12}$ and LaOBr.

8. A molecular fluorine laser system, comprising:
a gain medium including a gas mixture of fluorine and a buffer gas for generating a beam of ultraviolet radiation having a wavelength around 157 nm;
a discharge unit and a high voltage power supply for supplying energy to the gain medium;
a resonator including a wavelength selector for generating a narrowed output beam having a bandwidth of less than 0.6 pm;
a detector for measuring an energy of the output beam including a light sensitive element and a frequency conversion coating for absorbing incident 157 nm light and re-emitting light having a wavelength longer than 240 nm in a direction toward said light sensitive element, such that a dark current background, known to grow rapidly when light sensitive elements are used without protective frequency conversion coatings, is suppressed permitting the detector to have a lifetime of more than one billion laser pulses and permitting the laser system to remain on-line to perform continuous industrial processing during the more than one billion laser pulse lifetime of said light sensitive element; and
a processor for receiving a signal from the detector indicative of the measured energy of the laser beam, and for sending a signal to the high voltage power supply based on the measured energy to control the high voltage power supply to supply a particular energy to the discharge circuit for stabilizing an energy of the output beam of the laser through a feedback loop including the detector, the processor and the high voltage power supply and discharge circuit.

9. The laser system of claim 8, wherein the wavelength selection unit includes a grating.

10. The laser system of claim 8, wherein the wavelength selection unit includes a prism.

11. The laser system of claim 10, wherein the wavelength selection unit further includes an etalon.

12. The laser system of claim 8, wherein the light sensitive element is a photodiode.

13. The laser system of claim 12, wherein the frequency conversion coating comprises a fluorophor doped with a dopant selected from the group of dopants consisting of Tb, Tm, Eu, Ag and Cs.

14. The laser system of claim 13, wherein the frequency conversion coating comprises a compound selected from the group consisting of $Y_2SiO_5$, LaOBr, $InBO_3$, $La_2O_2S$:Eu, $Y_2O_3$, ZnS, LaOCl, $Y_3Al_5O_{12}$, $Y_3(Al,Ga)_5O_{12}$ and LaOBr.

15. An argon fluoride laser system, comprising:
a gain medium including a gas mixture of argon, fluorine and a buffer gas for generating a beam of ultraviolet radiation having a wavelength around 193 nm;
a discharge unit and a high voltage power supply for supplying energy to the gain medium;
a resonator including a wavelength selector for generating a narrowed output beam having a bandwidth of less than 0.6 pm;
a detector for measuring a wavelength of the output beam including a light sensitive element and a frequency conversion coating for absorbing incident 193 nm light and re-emitting light having a wavelength longer than 240 nm in a direction toward said light sensitive element, such that a dark current background, known to grow rapidly when light sensitive elements are used without protective frequency conversion coatings, is suppressed permitting the detector to have a lifetime of more than one billion laser pulses and permitting the laser system to remain on-line to perform continuous industrial processing during the more than one billion laser pulse lifetime of said light sensitive element; and
a processor for receiving a signal from the detector indicative of the measured wavelength of the laser beam, and for sending a signal to the wavelength selector based on the measured wavelength to control the wavelength selector to select a particular wavelength of the output beam of the laser through a feedback loop including the detector, the processor and the wavelength selector.

16. The laser system of claim 15, wherein the wavelength selection unit includes a grating.

17. The laser system of claim 16, wherein the wavelength selection unit further includes a prism.

18. The laser system of claim 17, wherein the wavelength selection unit further includes an etalon.

19. The laser system of claim 15, wherein the light sensitive element is a photodiode.

20. The laser system of claim 19, wherein the frequency conversion coating comprises a fluorophor doped with a dopant selected from the group of dopants consisting of Tb, Tm, Eu, Ag and Cs.

21. The laser system of claim 20, wherein the frequency conversion coating comprises a compound selected from the group consisting of $Y_2SiO_5$, LaOBr, $InBO_3$, $La_2O_2S$:Eu, $Y_2O_3$, ZnS, LaOCl, $Y_3Al_5O_{12}$, $Y_3(Al,Ga)_5O_{12}$ and LaOBr.

22. A molecular fluorine laser system, comprising:
a gain medium including a gas mixture of fluorine and a buffer gas for generating a beam of ultraviolet radiation having a wavelength around 157 nm;
a discharge unit and a high voltage power supply for supplying energy to the gain medium;
a resonator including a wavelength selector for generating a narrowed output beam having a bandwidth of less than 0.6 pm;
a detector for measuring a wavelength of the output beam including a light sensitive element and a frequency conversion coating for absorbing incident 157 nm light and re-emitting light having a wavelength longer than 240 nm in a direction toward said light sensitive element, such that a dark current background, known to grow rapidly when light sensitive elements are used without protective frequency conversion coatings, is suppressed permitting the detector to have a lifetime of more than one billion laser pulses and permitting the laser system to remain on-line to perform continuous industrial processing during the more than one billion laser pulse lifetime of said light sensitive element; and a processor for receiving a signal from the detector indicative of the measured wavelength of the laser beam, and for sending a signal to the wavelength selector based on the measured wavelength to control the wavelength selector to select a particular wavelength of the output beam of the laser through a feedback loop including the detector, the processor and the wavelength selector.

23. The laser system of claim 22, wherein the wavelength selection unit includes a grating.

24. The laser system of claim 22, wherein the wavelength selection unit includes a prism.

25. The laser system of claim 24, wherein the wavelength selection unit further includes an etalon.

26. The laser system of claim 22, wherein the light sensitive element is a photodiode.

27. The laser system of claim 26, wherein the frequency conversion coating comprises a fluorophor doped with a dopant selected from the group of dopants consisting of Tb, Tm, Eu, Ag and Cs.

28. The laser system of claim 27, wherein the frequency conversion coating comprises a compound selected from the group consisting of $Y_2SiO_5$, LaOBr, $InBO_3$, $La_2O_2S$:Eu, $Y_2O_3$, ZnS, LaOCl, $Y_3Al_5O_{12}$, $Y_3(Al,Ga)_5O_{12}$ and LaOBr.

\* \* \* \* \*